US008065288B1

(12) United States Patent
Garland et al.

(10) Patent No.: US 8,065,288 B1
(45) Date of Patent: Nov. 22, 2011

(54) SYSTEM, METHOD, AND COMPUTER PROGRAM PRODUCT FOR TESTING A QUERY AGAINST MULTIPLE SETS OF OBJECTS UTILIZING A SINGLE INSTRUCTION MULTIPLE DATA (SIMD) PROCESSING ARCHITECTURE

(75) Inventors: Michael J. Garland, Lake Elmo, MN (US); Samuli M. Laine, Vantaa (FI); Timo O. Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 506 days.

(21) Appl. No.: 11/938,091

(22) Filed: Nov. 9, 2007

(51) Int. Cl.
*G06F 7/00* (2006.01)
*G06F 17/30* (2006.01)

(52) U.S. Cl. ........................ 707/706; 345/419
(58) Field of Classification Search .................. 345/419; 707/706, 712
See application file for complete search history.

(56) References Cited

U.S. PATENT DOCUMENTS

| | | | |
|---|---|---|---|
| 4,628,483 A | 12/1986 | Nelson | |
| 5,193,207 A | 3/1993 | Vander Vegt et al. | |
| 5,274,718 A * | 12/1993 | Leonardi et al. | 382/240 |
| 5,594,844 A * | 1/1997 | Sakai et al. | 345/427 |
| 5,621,908 A | 4/1997 | Akaboshi et al. | |
| 5,650,862 A | 7/1997 | Shimizu et al. | |
| 5,963,212 A | 10/1999 | Bakalash | |
| 6,065,005 A | 5/2000 | Gal et al. | |
| 6,489,955 B1 * | 12/2002 | Newhall, Jr. | 345/419 |
| 6,518,971 B1 | 2/2003 | Pesto, Jr. et al. | |
| 6,556,200 B1 * | 4/2003 | Pfister et al. | 345/426 |
| 6,825,839 B2 | 11/2004 | Huang et al. | |
| 6,879,980 B1 | 4/2005 | Kothuri et al. | |
| 7,146,486 B1 * | 12/2006 | Prokopenko et al. | 712/22 |
| 7,194,125 B2 * | 3/2007 | Vlasic et al. | 382/154 |
| 7,348,975 B2 * | 3/2008 | Reshetov et al. | 345/421 |
| 7,580,927 B1 | 8/2009 | Abugov et al. | |
| 7,616,782 B2 | 11/2009 | Badawy | |
| 7,903,125 B1 | 3/2011 | Ayers et al. | |
| 2003/0028509 A1 | 2/2003 | Sah et al. | |
| 2004/0210596 A1 | 10/2004 | Budd et al. | |
| 2005/0001844 A1 | 1/2005 | Naegle | |
| 2005/0177564 A1 | 8/2005 | Kobayashi et al. | |

(Continued)

FOREIGN PATENT DOCUMENTS

WO 2007082042 A2 7/2007

(Continued)

OTHER PUBLICATIONS

Wald et al., SIMD Ray Stream Tracing—SIMD Ray Traversal with Generalized Ray Packets and On-the-fly Re-Ordering, Aug. 2, 2007, SCI Institute Technical Report, UUSCI-2007-012, pp. 1-8.*

(Continued)

*Primary Examiner* — James Trujillo
*Assistant Examiner* — Pavan Mamillapalli
(74) *Attorney, Agent, or Firm* — Zilka-Kotab, PC (57) ABSTRACT

A system, method, and computer program product are provided for testing a query against multiple sets of objects. In operation, a query is tested against a first set of objects, utilizing a single instruction multiple data processing architecture. Additionally, a second set of objects is selected based on a result of testing the query against the first set of objects. Furthermore, the query is tested against the second set of objects, utilizing the single instruction multiple data processing architecture.

18 Claims, 6 Drawing Sheets

U.S. PATENT DOCUMENTS

| | | | |
|---|---|---|---|
| 2007/0159488 | A1 | 7/2007 | Danskin et al. |
| 2007/0165035 | A1 | 7/2007 | Duluk, Jr. et al. |
| 2007/0169042 | A1 | 7/2007 | Janczewski |
| 2007/0182732 | A1 | 8/2007 | Woop et al. |
| 2007/0264023 | A1 | 11/2007 | Gorrell et al. |
| 2008/0043018 | A1* | 2/2008 | Keller et al. ............ 345/426 |
| 2008/0316214 | A1 | 12/2008 | Peeper |
| 2009/0089542 | A1 | 4/2009 | Laine et al. |
| 2009/0106530 | A1 | 4/2009 | Lauterbach et al. |
| 2010/0076941 | A1 | 3/2010 | Dotsenko et al. |

FOREIGN PATENT DOCUMENTS

| | | | |
|---|---|---|---|
| WO | 2008127610 | A3 | 10/2008 |
| WO | 2008127622 | A3 | 10/2008 |
| WO | 2008127623 | A3 | 10/2008 |

OTHER PUBLICATIONS

Wald et al., Interactive rendering with Coherent Ray Tracing, 2001, Blackwell Publishers, vol. 20, 153-164.*
Popov et al., "Stackless KD-Tree Traversal for High Performance GPU Ray Tracing," Eurographics 2007, vol. 26 (2007), No. 3.
Sengupta et al., "Scan Primitives for GPU Computing," Proceedings of Graphics Hardware 2007, San Diego, CA, Aug. 4-5, 2007.
Harris et al., "Parallel Prefix Sum Scan with CUDA," to appear in *GPU Gems 3*, Hubert Nguyen, ed., Addison-Wesley, 2007.
Blelloch, "Prefix Sums and Their Applications," Carnegie Mellon University School of Computer Science, Technical Report CMU-CS-90-190, Nov. 1990.
U.S. Appl. No. 11/862,938, filed Sep. 27, 2007.
D. Naishlos, J. Nuzmati, C-W. Tseng and U. Vishkin, 2001. Towards a first vertical prototyping of an extremely fine-grained parallel programming approach. In *Proc. 13th ACM Symposium on Parallel Algorithms and Architecture (SPAA 01)*, Jul. 2001.
U.S. Appl. No. 11/942,608, filed Nov. 19, 2007.
Horn et al., "Interactive k-D Tree GPU Raytracing," graphics.stanford.edu/papers/i3dkdtree/i3dkdtreeonline.ppt.
U.S. Appl. No. 11/874,093, filed Oct. 17, 2007.
Johannes Günther, Stefan Popov, Hans-Peter Seidel, and Philipp Slusallek. "Realtime Ray Tracing on GPU with BVH-based Packet Traversal." Proceedings of the IEEE/Eurographics Symposium on Interactive Ray Tracing 2007, pp. 113-118. .mpi-inf.mpg.de/~guenther/BVHonGPU/BVHonGPU.pdf.
U.S. Appl. No. 11/940,782, filed Nov. 15, 2007.
U.S. Appl. No. 11/927,099, filed Oct. 29, 2007.
V. Havran and J. Bittner. "Efficient sorting and searching in rendering algorithms." *Eurographics 2006 Tutorials*, Tutorial T4, Aug. 2006.
I. Kamel and C. Faloutsos. "On Packing R-trees," In *Proc. 2nd Int'l Conf. on Information & Knowledge Management*, Nov. 1993.
C. Wächter and A. Keller. "Instant Ray Tracing: The Bounding Interval Hierarchy." In *Proc. Eurographics Symposium on Rendering Techniques*, Apr. 2006.
V. Pascucci and R. Frank. "Global Static Indexing for Real-time Exploration of Very Large Regular Grids." In *Proc. Supercomputing 2001*, Nov. 2001.
S.-E. Yoon, P. Lindstrom, V. Pascucci, and D. Manocha. "Cache-oblivious mesh layouts." *ACM Transactions on Graphics*, Proc. SIGGRAPH 2005, 24(3), Jul. 2005.
G. Blelloch, 1990. *Vector Models for Data-Parallel Computing*. MIT Press, ISBN 0-262-02313-X, 1990. .cs.cmu.edu/~guyb/papers/Ble90.pdf.
Thinking Machines Corp., 1990. *Connection Machine Model CM-2 Technical Summary*. Version 6.0, Nov. 1990.
V. Havran. "*Heuristic Ray Shooting Algorithms*." Ph.D. thesis, Czech Technical University, Nov. 2000.
Ingo Wald. *Realtime Ray Tracing and Interactive Global Illumination*. Ph.D. dissertation, Universität des Saarlandes, 2004. .sci.utah.edu/~wald/Publications/2004/WaldPhD/download/phd.pdf.
Final Office Action from U.S. Appl. No. 11/927,099 mailed Jun. 1, 2011.
Final Office Action from U.S. Appl. No. 11/927,159 mailed May 26, 2011.
Final Office Action from U.S. Appl. No. 11/942,608 mailed Apr. 29, 2011.
Final Office Action from U.S. Appl. No. 11/950,245 dated May 25, 2011.
Non-Final Office Action from U.S. Appl. No. 11/950,245 dated Oct. 5, 2010.
Advisory Action from U.S. Appl. No. 11/942,608 dated Jul. 18, 2011.
Sengupta, S. et al., U.S. Appl. No. 11/950,245, filed Dec. 4, 2007.
Sengupta, S. et al, U.S. Appl. No. 12/333,244, filed Dec. 11, 2008.
Garland, M. et al., U.S. Appl. No. 12/333,255, filed Dec. 11, 2008.
Blelloch, G. E., "Programming Parallel Algorithms," Communications of the ACM, Mar. 1996, vol. 39, No. 3, pp. 85-97.
Blelloch et al., "Implementation of a Portable Nested Data-Parallel Language," Journal of Parallel and Distributed Computing, Apr. 1994, 21(1), pp. 4-14.
Chatterjee, S. et al., "Scan Primitives for Vector Computers," Proceedings of Supercomputing '90, Nov. 12-16, 1990, pp. 666-675.
Sengupta, S. et al., "Data-Parallel GPU Computing," May 31, 2008, pp. 1-28.
Stratton, J. A. et al., "MCUDA: An Efficient Implementation of CUDA Kernals on Multi-Cores," IMPACT Technical Report, IMPACT-08-01, Mar. 12, 2008, pp. 1-18.
Final Office Action from U.S. Appl. No. 11/950,193 dated Jul. 22, 2011.
Arvo et al., "Fast Ray Tracing by Ray Classification," Proceedings of the 14th Annual Conference on Computer Graphics and Interactive Techniques, SIGGRAPHS, Jul. 1987, pp. 55-64, Computer Graphics, vol. 21, No. 4, ACM, New York, NY.
Gottschalk et al., "OBBTree: A Hierarchical Structure for Rapid Interference Detection," Proceedings of the 23rd Annual Conference on Computer Graphics and Interactive Techniques, 1996, pp. 171-180, vol. 30, ACM, New York, NY.
Hillis et al., "Data Parallel Algorithms," Communications of the ACM, Dec. 1986, pp. 1170-1183, vol. 29, No. 12, ACM, New York, NY.
Roger et al., "Whitted Ray-Tracing for Dynamic Scenes using a Ray-Space Hierarchy on the GPU," Proceedings of the Eurographics Symposium on Rendering, The Eurographics Association, Jun. 2007, pp. 99-110, ACM.
Sato et al., "Implementing the PRAM Algorithms in the Multithread Architecture and Evaluating the Performance," Information Processing Society of Japan (IPSJ), SIG Notes '98 (28), Mar. 20, 1998, pp. 39-46, Japan, Abstract Translation Only.
Wald, Ingo , "On Fast Construction of SAH-based Bounding Volume Hierarchies," IEEE Symposium on Interactive Ray Tracing, 2007, pp. 33-40, RT 2007, IEEE Computer Society, Washington DC.
Zagha et al., "Radix Sort for Vector Multiprocessors," Proceedings of the 1991 ACM/IEEE Conference on Supercomputing, Nov. 1991, pp. 712-721, ACM, New York, NY.
German Office Action from Application No. 10-2008-031998.8-53 dated Mar. 9, 2010.
Notice of Preliminary Rejection from Korean Patent Application No. 10-2008-0113250 dated May 28, 2010.
Notice of Preliminary Rejection from Korean Patent Application No. 10-2008-0094936 dated Feb. 26, 2010.
Advisory Action from U.S. Appl. No. 11/862,938 dated Aug. 23, 2010.
Final Office Action from U.S. Appl. No. 11/862,938 dated Jun. 9, 2010.
Final Office Action from U.S. Appl. No. 11/938,091 dated Oct. 14, 2010.
Final Office Action from U.S. Appl. No. 11/940,782 dated Sep. 16, 2010.
Final Office Action from U.S. Appl. No. 11/942,608 dated May 10, 2010.
Non-Final Office Action from U.S. Appl. No. 11/862,938 dated Dec. 1, 2009.
Non-Final Office Action from U.S. Appl. No. 11/927,099 dated Oct. 4, 2010.
Non-Final Office Action from U.S. Appl. No. 11/927,159 dated Sep. 17, 2010.
Non-Final Office Action from U.S. Appl. No. 11/940,782 dated May 20, 2010.

Non-Final Office Action from U.S. Appl. No. 11/942,608 dated Nov. 4, 2010.

Non-Final Office Action from U.S. Appl. No. 11/942,608 dated Dec. 18, 2009.

U.S. Appl. No. 11/927,159, filed Oct. 29, 2007.

Notice of Preliminary Rejection from Korean Application No. 10-2008-113250, dated Dec. 17, 2010.

Non-Final Office Action from U.S. Appl. No. 11/950,193, dated Feb. 3, 2011.

U.S. Appl. No. 11/950,193, filed Dec. 4, 2007.

Dotsenko, Y. et al., "Fast Scan Algorithms on Graphics Processors," International Conference on Supercomputing, Jun. 7-12, 2008, pp. 205-213.

Gibbons, P. B., "A More Practical PRAM Model," ACM Symposium on Parallel Algorithms and Architectures—SPAA, 1989, pp. 158-168.

Hensley, J. et al., "Fast Summed-Area Table Generation and its Applications" EUROGRAPHICS 2005, 2005, vol. 24, No. 3, pp. 1-9.

Horn, D., "Stream Reduction Operations for GPGPU Applications," GPU Gems 2: Programming Techniques for High-Performance Graphics and General-Purpose Computation, Chapter 36, Second Printing, Apr. 2005, retrieved from http://http.developer.nvidia.com/GPUGems2/gpugems2_chapter36.html on Jul. 12, 2011, pp. 1-11.

Iverson, K. E., "A Programming Language," John Wiley & Sons, Fourth Printing, May 1967, pp. vii-xxi and 1-286.

Lindholm, E. et al., "NVIDIA Tesla: A Unified Graphics and Computing Architecture," IEEE Micro, Mar.-Apr. 2008, pp. 39-55.

Nickolls, J. et al., "Scalable Parallel Programming with CUDA," ACM Queue, Mar.-Apr. 2008, pp. 42-53.

NVIDIA Corporation, "NVIDIA CUDA Programming Guide," Nov. 29, 2007, Version 1.1, pp. ii-xiii and 1-128.

Reshetov et al., "Multi-Level Ray Tracing Algorithm" ACM Tansactions on Graphics (TOG)-Proceedigns of ACM SIGGRAPH 2005, Jul. 2005, vol. 24, Issue 3, pp. 1176-1185, New York, NY.

Schwartz, J. T., "Ultracomputers," ACM Transactions on Programming Languages and Systems, Oct. 1980, vol. 2, No. 4, pp. 484-521.

Sengupta, S. et al., "A Work-Efficient Step-Efficient Prefix-Sum Algorithm," Proceedings of the Workshop on Edge Computing Using New Commodity Architectures, 2006, pp. 1-2.

Advisory Action from U.S. Appl. No. 11/950,245 dated Aug. 16, 2011.

Examiner's Answer from U.S. Appl. No. 11/862,938 dated Aug. 17, 2011.

Advisory Action from U.S. Appl. No. 11/950,193 dated Oct. 3, 2011.

* cited by examiner

SYSTEM, METHOD, AND COMPUTER PROGRAM PRODUCT FOR TESTING A QUERY AGAINST MULTIPLE SETS OF OBJECTS UTILIZING A SINGLE INSTRUCTION MULTIPLE DATA (SIMD) PROCESSING ARCHITECTURE

FIELD OF THE INVENTION

The present invention relates to single instruction multiple data processing architectures, and more particularly to testing data utilizing such architectures.

BACKGROUND

In some processor cores of current parallel multiprocessors, numerous threads may be executed concurrently. Furthermore, the threads may be packed together into groups called "warps," which are executed in a single instruction multiple data (SIMD) fashion, meaning that at any one instant, all threads within a warp are executing the same instruction on their own private data values. If different threads within a warp need to execute different instructions, each thread must execute its desired operation while all other threads that do not wish to execute this operation are idle. This condition, known as divergence, is often undesirable as idling threads are unutilized, thus reducing total computational throughput.

The foregoing parallel multiprocessors are capable of many different applications. For instance, much effort has been made to adapt ray tracing algorithms to work well with such architectures. Ray tracing involves a technique for determining the visibility of an object or objects from a given point, such as, but not limited to an "eye" or "camera" point, by following a ray. While such techniques theoretically can involve testing a vast number of rays against each and every geometric primitive, this is typically not practical. Instead, designers have used various data structures to identify a subset of such primitives to be involved in the testing, thereby reducing required processing.

To accomplish this, objects are typically organized in a tree-structured spatial hierarchy, such as a bounding volume hierarchy (BVH), a kd-tree (k-dimensional tree), or a binary space partitioning (BSP) tree. However, determining how to traverse such a tree efficiently and find the object or objects that are intersected by a given ray may pose a challenge, particularly with single instruction multiple data processing architectures. For example, when formulating ray tracing algorithms on a graphics processing unit (GPU), care must be taken when assigning rays and traversal tests to the various parallel threads of execution, in order to minimize the aforementioned divergence due to the different threads in a warp making different decisions, etc. There is thus a need for addressing these and/or other issues associated with the prior art.

SUMMARY

A system, method, and computer program product are provided for testing a query against multiple sets of objects. In operation, a query is tested against a first set of objects, utilizing a single instruction multiple data processing architecture. Additionally, a second set of objects is selected based on a result of testing the query against the first set of objects. Furthermore, the query is tested against the second set of objects, utilizing the single instruction multiple data processing architecture.

DETAILED DESCRIPTION

Figure 1:
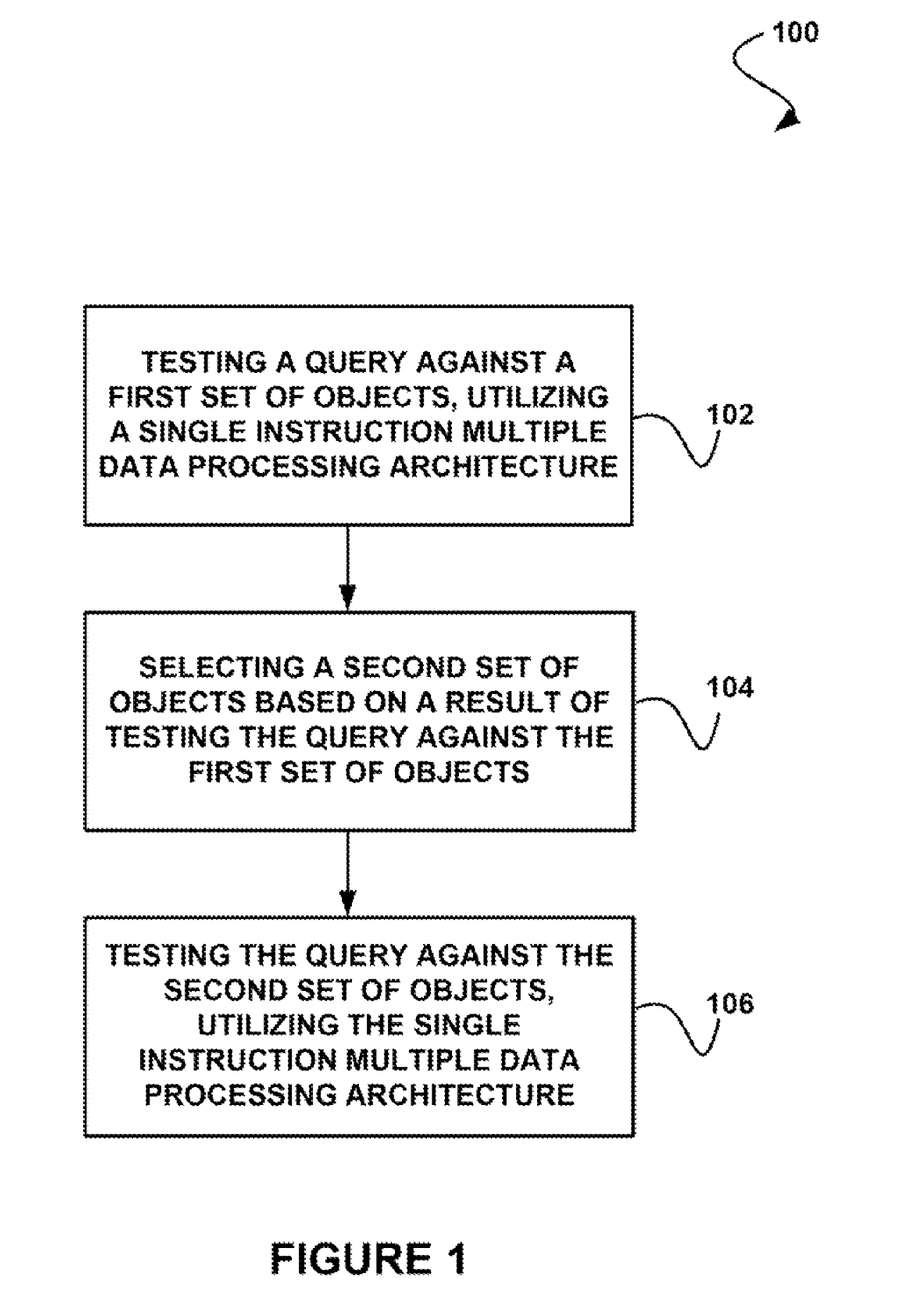
FIG. 1 shows a method for testing a query against multiple sets of objects, in accordance with one embodiment of the present invention.

FIG. 1 shows a method 100 for testing a query against multiple sets of objects, in accordance with one embodiment of the present invention. As shown, a query is tested against a first set of objects, utilizing a single instruction multiple data (SIMD) processing architecture. See operation 102.

In the context of the present description, a query refers to any query that may be tested against objects. For example, testing the query may include, but is not limited to testing rays against objects, testing particles against objects, etc. Strictly as an option, the query may be tested for performing ray tracing. For example, the query may be tested against the first set of objects for identifying an intersection of a ray with the first set of objects. As another option, the query may be tested for performing collision detection.

Further, in the context of the present description, an object refers to any data against which a query may be tested. For example, in various embodiments, the objects may include, but are not limited to data objects, geometric objects, and/or any other data that meets the above definition. In one embodiment, the objects may include at least one primitive (e.g. point, line or line segment, plane, triangle, etc.).

As shown further, a second set of objects is selected based on a result of testing the query against the first set of objects. See operation 104. Additionally, the query is tested against the second set of objects, utilizing the SIMD processing architecture. See operation 106. In various embodiments, the SIMD processing architecture may include a central processing unit, and/or a graphics processor. To this end, in one embodiment, the same SIMD processing architecture may be used to test the same query against different sets of objects.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
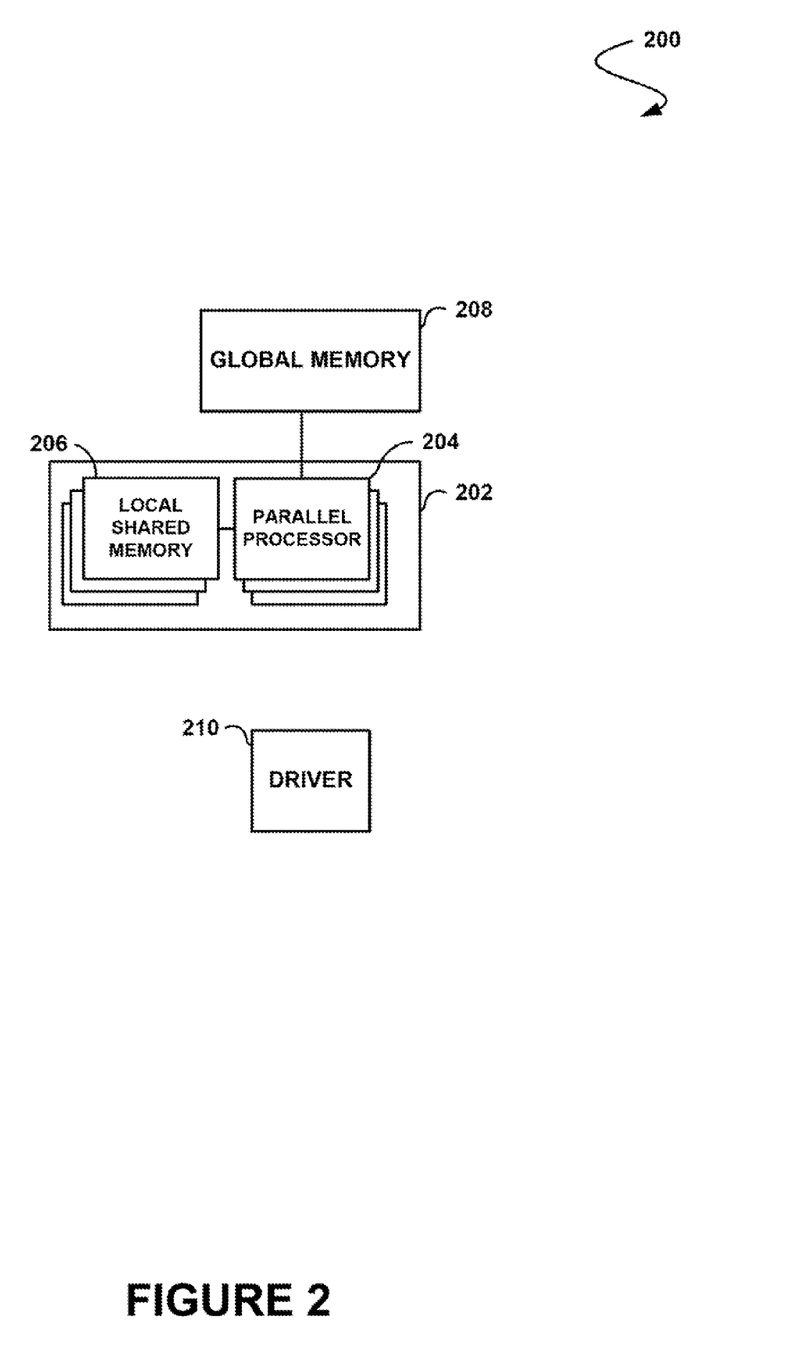
FIG. 2 shows a system for assigning elements of a data structure to threads for processing, in accordance with one embodiment of the present invention.

FIG. 2 shows a system 200 for assigning elements of a data structure to threads for processing, in accordance with one embodiment of the present invention. As an option, the present system may be implemented to carry out the method of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

Such parallel processing architecture may include a SIMD architecture. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads may refer to a "warp size" of the corresponding processor.

In one possible embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture may include local shared memory 206. Each of the parallel processors of the parallel processing architecture may read and/or write to its own local shared memory. This shared memory may consist of physically separate memories associated with each processor or it may include separately allocated regions of one or more memories shared amongst the processors. Further, in the illustrated embodiment, the shared memory may be embodied on an integrated circuit on which the processors of the parallel processing architecture are embodied.

Still yet, global memory 208 may be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein. Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control the parallel processing architecture to operation in accordance with the method of FIG. 1.

For example, a query may be tested against a first set of objects, utilizing a SIMD processing architecture corresponding to the parallel processing architecture of FIG. 2. A second set of objects may then be selected based on a result of testing the query against the first set of objects. Additionally, the same query may be tested against the second set of objects, utilizing the same SIMD processing architecture.

In one embodiment, the objects may be geometric primitives (e.g., triangles, polygons, spheres, boxes, etc.), and the query may be tested for performing ray tracing. In this case, the query may be tested against the first set of objects and the second set of objects for identifying at least one point of intersection of a ray with the first set of objects and the second set of objects. Utilizing the system of FIG. 2, a single ray may be tested by a number of threads (e.g. a warp) capable of being executed by the SIMD processing architecture, in parallel. In another embodiment, a single ray may be tested by a subset of a number threads capable of being executed by the SIMD processing architecture, in parallel.

Figure 3:
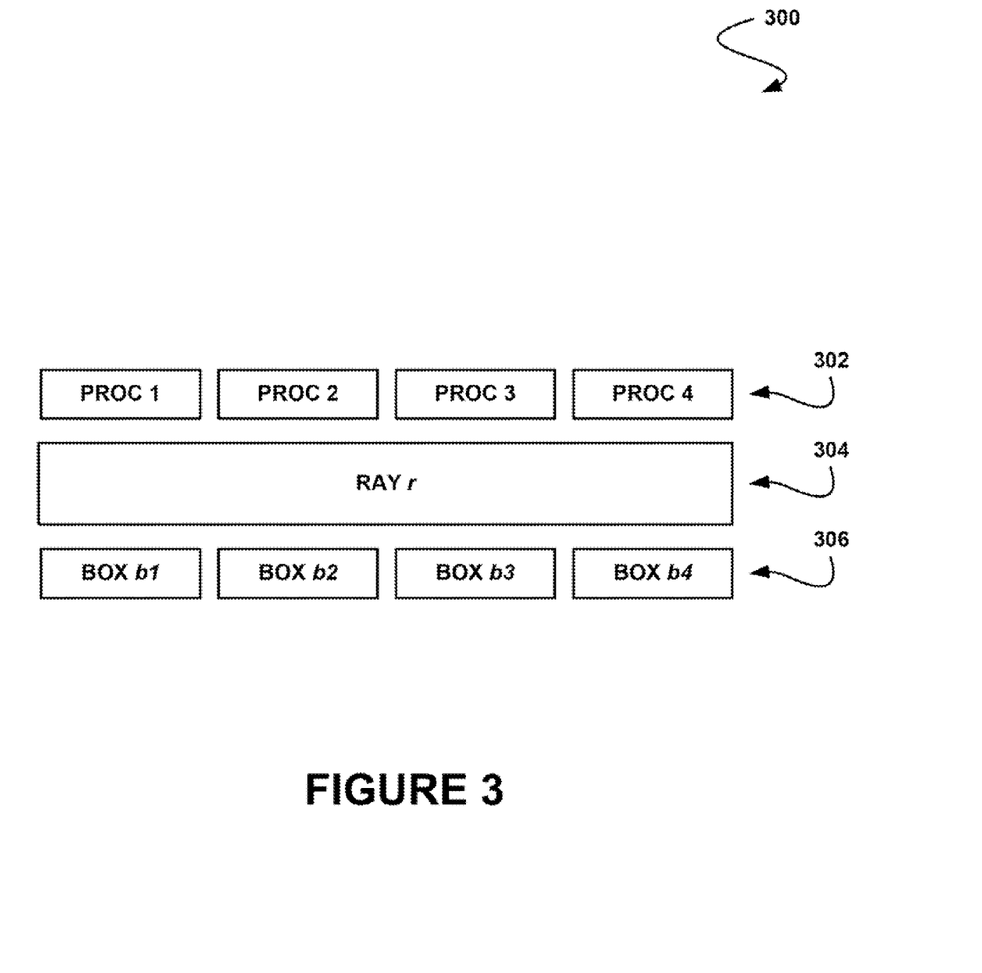
FIG. 3 shows a technique for testing a single ray utilizing a number of threads executed by a single instruction multiple data (SIMD) processing architecture, in accordance with one embodiment of the present invention.

FIG. 3 shows a technique 300 for testing a single ray utilizing a number of threads executed by a SIMD processing architecture, in accordance with one embodiment of the present invention. As an option, the present technique may be implemented to in the context of the details of FIGS. 1-2. Of course, however, the technique may be implemented in any desired environment. It should also be noted that the aforementioned definitions may apply during the present description.

As shown, a SIMD processing architecture is provided including a plurality of processing threads in a SIMD unit 302 with a warp size of 4. As shown further, a single ray 304 may be assigned to all of the threads (e.g. a warp) in the SIMD unit. In operation, a search tree (e.g. a hierarchical or tree data structure) may be traversed in response to a query.

For example, given a ray in space, it may be determined which objects in a scene of data are intersected by the ray. In one embodiment, the object may include a plurality of geometric primitives (e.g. triangles, etc.) organized in a data tree structure. In various embodiments, the data tree may include a bounding volume hierarchy (BVH), a kd-tree (k-dimensional tree), a binary space partitioning (BSP) tree, or any other tree data structure. As an option, the tree data structure may include a BVH which corresponds to a plurality of bounding volumes (e.g. bounding boxes 306).

In the context of the present description, a BVH refers to a data tree of bounding volumes (e.g. spheres, axis-aligned bounding boxes, and/or oriented bounding boxes, etc.). At the top of the data tree, a bounding volume (e.g. a node) may include a large set of data (e.g. a global set of data). At the bottom of the data tree (e.g. at leaf nodes), a bounding volume may include a smaller set of data (e.g. k primitives).

In this case, the number of items contained within the bounding volume may be determined by a threshold. For example, a threshold may determine that three primitives per bounding box are sufficient. Of course, such threshold is set forth for exemplary purposes only, and should not be construed as limiting in any manner.

In one embodiment, the traversal of the tree data structure may include a cohesive traversal, where the branching factor of the tree data structure matches the number of threads in the warp (i.e. the warp size). In this case, the single ray may be assigned to the warp. In the context of the present description, cohesive traversal refers to a technique which utilizes all threads of a warp or sub-warp to test a single ray or query against a collection of bounding boxes or objects.

During traversal, the warp may examine a node of the data tree structure, beginning with the root, and decide which (if any) children of the node to explore next. The entire warp may then proceed to examine one selected child node, deferring the rest for later consideration. In one embodiment, deferral may be implemented utilizing a stack. For example, the stack may include a container of nodes which utilizes a basic push and pop operation.

In another embodiment, deferral may be implemented utilizing a work queue. For example, the deferred nodes may be placed in the work queue while a selected child node is examined. The work queue may then be utilized to access the child nodes which have not been examined.

Because an entire warp considers the children of one node and all the threads in the warp collectively decide what node to explore next, divergence between threads may be eliminated. In one embodiment, all of the children of a node may be stored in memory contiguously. In this case, a warp may always fetch contiguous chunks of memory when performing the traversal, thus making its memory accesses coherent.

Figure 4:
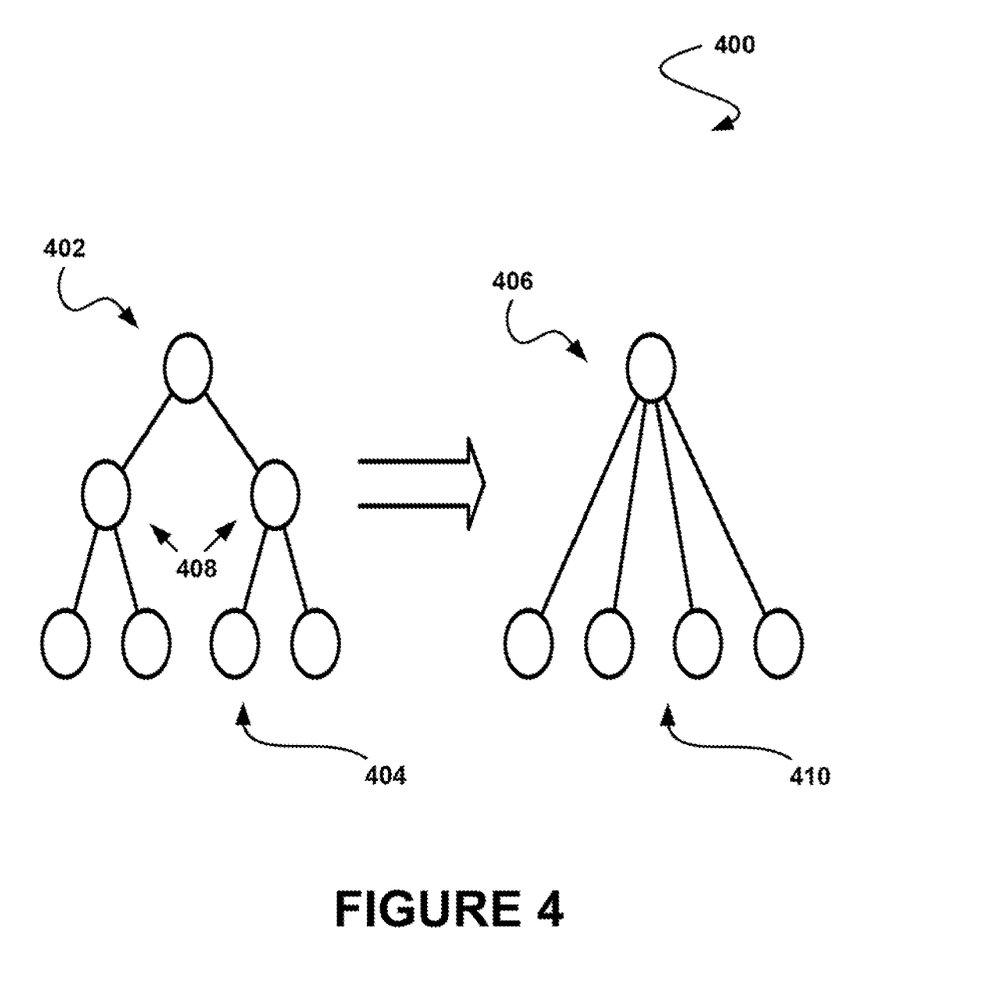
FIG. 4 shows a technique for building multi-way tree data structures from the more common binary tree data structures, in accordance with one embodiment of the present invention.

FIG. 4 shows a technique 400 for building multi-way tree data structures from the more common binary tree data structures, in accordance with one embodiment of the present invention. As an option, the present technique may be implemented in the context of the details of FIGS. 1-3. Of course, however, the technique may be implemented in any desired environment. It should also be noted that the aforementioned definitions may apply during the present description.

As shown, a binary data tree structure 402 is provided. The binary data tree structure may be any type of tree data structure. For example, the binary tree structure may be a surface area heuristic (SAH) guided k-d tree. In this case, the k-d tree may represent a binary data tree structure with all primitives (e.g. triangles, etc.) of a scene stored at leaves 404.

In the context of the present description a surface area heuristic guided tree, refers to any data tree structure resulting from applying a surface area heuristic to a set of data. For example, a best split may be found for a data set (e.g. a scene of data) using a surface area heuristic. The data set may be represented by the top node the data tree, for example.

In one embodiment, the split may include a split with a lowest SAH cost. For example, a group of primitives (e.g. a node in the data structure) may be split. Each split may bounded by a bounding volume (e.g. a bounding box, etc.) and a ratio of a size of the bounding volume to a number of primitives in the box may be calculated. In this case, splits with a lower ratio may correspond to a lower SAH cost.

As shown further, a number of branches from a node of the hierarchical data structure to be traversed may be increased. In this case, the number of branches from the node of the hierarchical data structure may be increased by aggregating children from a plurality of levels of the hierarchical data structure. Thus, the binary tree may be converted into a multi-way tree 406 with a branching factor of four, by merging two levels 408 of the binary data tree. In general, the binary tree may be converted into a multi-way tree with a branching factor of $2^d$, by merging d levels of the binary data tree. In this way, the branching factor of the data tree may match the number of threads in a warp. As an option, a desired number of branches for a node may be achieved by aggregating children from one or more of levels of another hierarchical data structure having fewer branches per node.

Thus, a single ray may be assigned to the warp and tested using the plurality of threads included in the warp. In operation, the warp may examine a node of the data tree structure, beginning with the root, and decide which children of the node to explore next. The entire warp may then proceed to examine a selected child node.

In one embodiment, the hierarchical structure may be constructed such that a number of branches from each node is no greater than a number of threads that will process a single query. In another embodiment, a number of branches from a node of the hierarchical data structure being traversed may be less than or equal to a number of threads capable of being processed in parallel by a SIMD processing architecture. In this case, a single ray may be tested utilizing the number of threads. For example, a binary data tree may be merged such that the branching factor of a resulting tree is less than the number of threads available. In this case, all branches of nodes may be tested using a number of threads less than the total number of available threads.

Figure 5:
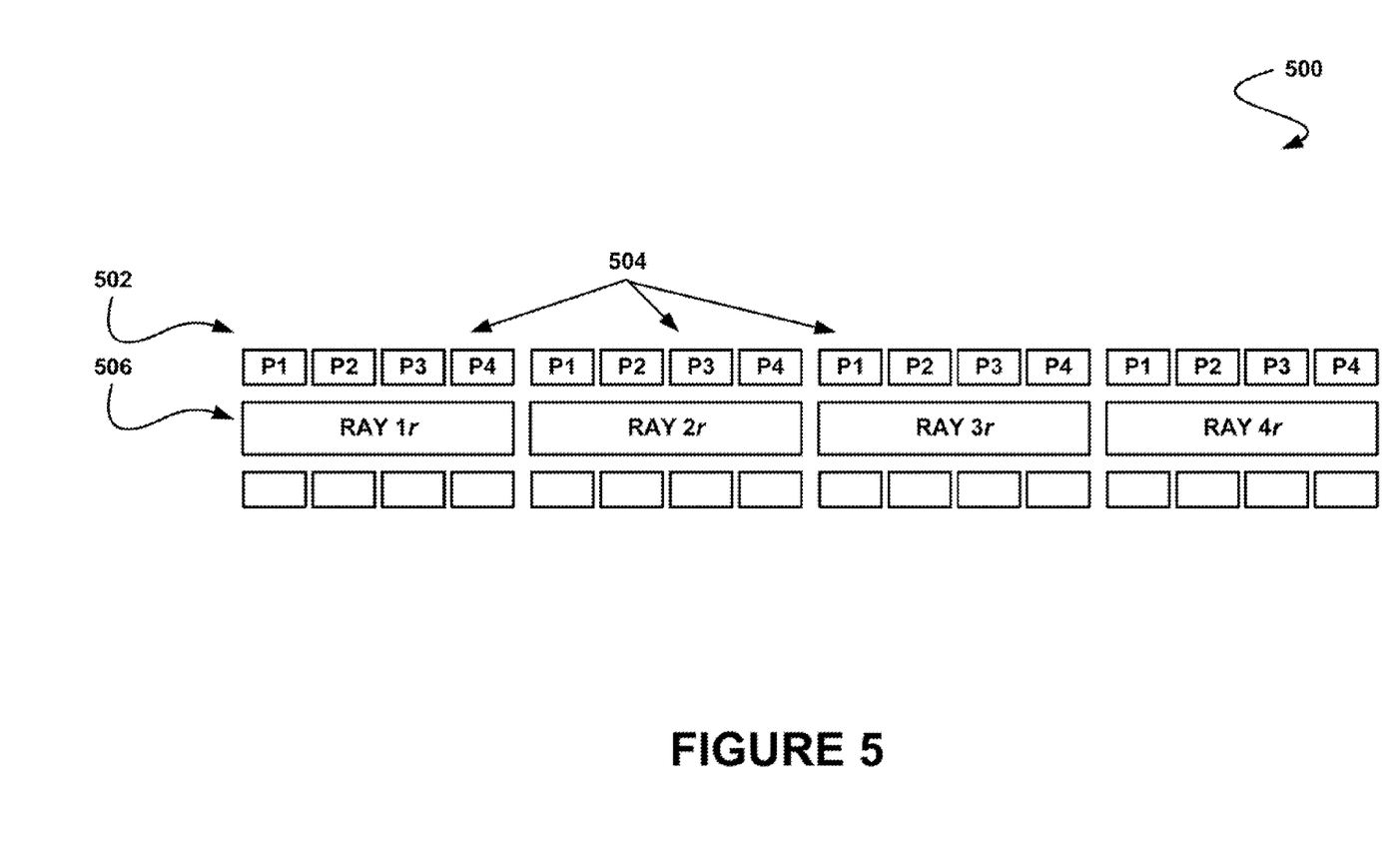
FIG. 5 shows a technique for providing cohesive traversal of multiple packets of data, in accordance with another embodiment of the present invention.

FIG. 5 shows a technique 500 for providing cohesive traversal of multiple packets of data, in accordance with one embodiment of the present invention. As an option, the present technique may be implemented in the context of the details of FIGS. 1-4. Of course, however, the technique may be implemented in any desired environment. It should also be noted that the aforementioned definitions may apply during the present description.

As shown, a warp 502 is subdivided into smaller sub-warps 504, each of which may perform cohesive traversal of a single ray 506. For example, a warp including a plurality of threads may be divided into a plurality of sub-warps that each include a plurality of threads. Thus, each ray included in a plurality of rays may be allocated to one of a plurality of sub-warps.

During traversal, each sub-warp may examine a node of a data tree structure to be traversed, beginning with a root node, and may subsequently decide which children of the node to explore next. Each sub-warp may then proceed to examine the selected child node. Child nodes not initially selected may be deferred for later consideration.

By dividing the warp into smaller sub-warps, each of which may perform cohesive traversal of a single ray, a SIMD packet of cohesive traversals may effectively be created. Thus, each SIMD packet may be traversed through a data tree together utilizing the sub-warps.

With continuing reference to FIG. 5, a packet of four 4-way cohesive traversals is shown to be created. In this way, a 4-way data tree may be utilized rather than a full 16-way data tree. It should be noted that, although the warp in FIG. 5 is illustrated with a warp size of 16, any warp size may be utilized. Similarly, the warp may be subdivided into any number of sub-warps, in various embodiments.

Additionally, the number of cohesive traversals per warp or sub-warp may vary depending on the application. For example, a graphics processing unit (GPU) may have an effective warp width of 32. In this case, 4 8-way traversals may be performed by splitting the warp into 4 sub-warps of size 8. Of course, such implementation may vary depending on the architecture.

Figure 6:
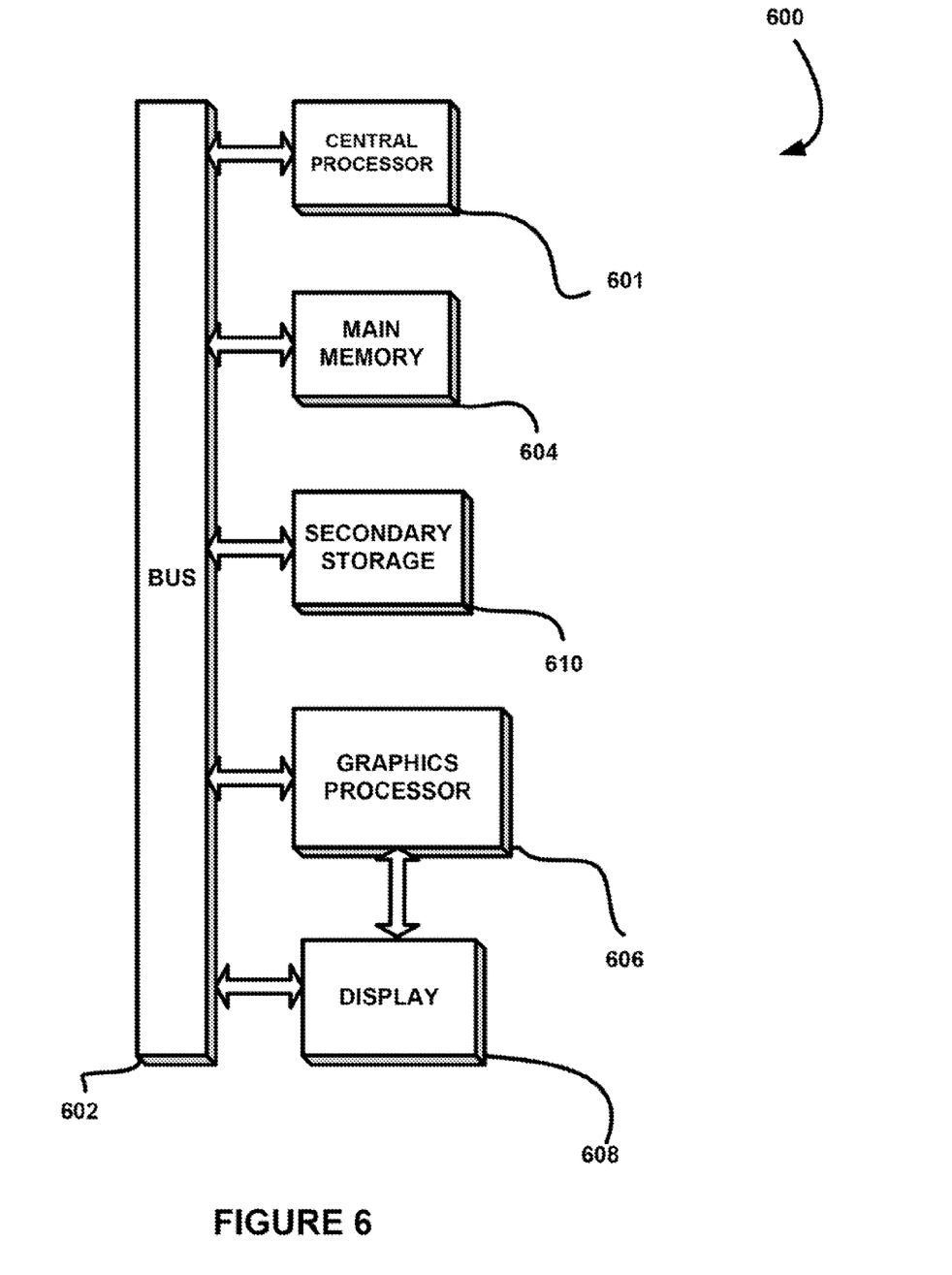
FIG. 6 illustrates an exemplary system in which the various architecture and/or functionality of the various previous embodiments may be implemented.

FIG. 6 illustrates an exemplary system in which the various architecture and/or functionality of the various previous embodiments may be implemented. As shown, a system 600 is provided including at least one host processor 601 which is connected to a communication bus 602. In one embodiment, the host processor may represent a plurality of processors.

In this case, each of the processors may include a plurality of threads. As an option, each of the processors may run in parallel as a parallel processor architecture. The system also includes a main memory 604. Control logic (software) and data are stored in the main memory which may take the form of random access memory (RAM).

The system may also include a graphics processor 606 and a display 608, i.e. a computer monitor. In one embodiment, the graphics processor may include a plurality of shader modules, a rasterization module, etc. Each of the foregoing modules may even be situated on a single semiconductor platform to form a GPU.

In one embodiment, the graphics processor may represent a plurality of processors. In this case, each of the processors may include a plurality of threads. As an option, each of the processors may run in parallel as a parallel processor architecture.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system may also include a secondary storage 610. The secondary storage includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not limited to, a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   testing a query against a first set of objects, utilizing a single instruction multiple data processing architecture;
   selecting a second set of objects based on a result of testing the query against the first set of objects; and
   testing the query against the second set of objects, utilizing the single instruction multiple data processing architecture;
   wherein testing the query against the first set of objects and the second set of objects includes testing a single ray against the first set of objects and the second set of objects by a number of threads executed by the single instruction multiple data processing architecture, in parallel;
   wherein the number of threads are divided into a subset of the number of threads, the single ray is allocated to the subset of the number of threads, and the subset of the number of threads perform a cohesive traversal of the single ray.

2. The method of claim 1, wherein the first set of objects and the second set of objects include a geometric object.

3. The method of claim 2, wherein the geometric object includes at least one primitive.

4. The method of claim 1, wherein the query is tested for performing ray tracing.

5. The method of claim 4, wherein the query is tested against the first set of objects and the second set of objects for identifying at least one point of intersection of the single ray with the objects.

6. The method of claim 1, wherein the single ray is tested by the subset of the number of threads executed by the single instruction multiple data processing architecture, in parallel.

7. The method of claim 1, wherein the testing includes traversing a hierarchical data structure.

8. The method of claim 7, wherein a number of branches from a node of the hierarchical data structure being traversed is less than or equal to the number of threads capable of being executed in parallel by the single instruction multiple data processing architecture.

9. The method of claim 8, wherein a plurality of children of the node are stored contiguously in memory.

10. The method of claim 7, wherein the hierarchical structure is constructed such that a number of branches from each node is no greater than a number of threads that will process a single query.

11. The method of claim 10, wherein a desired number of branches for a node is achieved by aggregating children from one or more of levels of another hierarchical data structure having fewer branches per node.

12. The method of claim 1, wherein the single instruction multiple data processing architecture includes one or more vector processing elements.

13. The method of claim 1, wherein the single instruction multiple data processing architecture includes a graphics processor.

14. A computer program product embodied on a computer readable medium, comprising:
   computer code for testing a query against a first set of objects, utilizing a single instruction multiple data processing architecture;
   computer code for selecting a second set of objects based on a result of testing the query against the first set of objects; and
   computer code for testing the query against the second set of objects, utilizing the single instruction multiple data processing architecture;
   wherein testing the query against the first set of objects and the second set of objects includes testing a single ray against the first set of objects and the second set of objects by a number of threads executed by the single instruction multiple data processing architecture, in parallel;
   wherein the computer program product is operable such that the number of threads are divided into a subset of the number of threads, the single ray is allocated to the subset of the number of threads, and the subset of the number of threads perform a cohesive traversal of the single ray.

15. An apparatus, comprising:
a single instruction multiple data processing architecture for performing a first test to test a query against a first set of objects, selecting a second set of objects based on a result of testing the query against the first set of objects, and performing a second test to test the query against the second set of objects;
wherein testing the query against the first set of objects and the second set of objects includes testing a single ray against the first set of objects and the second set of objects by a number of threads executed by the single instruction multiple data processing architecture, in parallel;
wherein the apparatus is operable such that the number of threads are divided into a subset of the number of threads, the single ray is allocated to the subset of the number of threads, and the subset of the number of threads perform a cohesive traversal of the single ray.

16. The apparatus of claim 15, wherein the single instruction multiple data processing architecture remains in communication with memory and a display via a bus.

17. The apparatus of claim 15, wherein the single instruction multiple data processing architecture includes one or more vector processing elements.

18. The apparatus of claim 15, wherein the single instruction multiple data processing architecture includes a graphics processor.

* * * * *